E. B. AYRES AND T. H. RHOADS.
WETTING OUT MACHINE FOR LEATHER.
APPLICATION FILED MAR. 26, 1920.

1,357,021.

Patented Oct. 26, 1920.

Inventors
Elwood B. Ayres
Thomas H. Rhoads
by their Attorneys

UNITED STATES PATENT OFFICE.

ELWOOD B. AYRES AND THOMAS H. RHOADS, OF PHILADELPHIA, PENNSYLVANIA, ASSIGNORS TO THE PHILADELPHIA TEXTILE MACHINERY COMPANY, OF PHILADELPHIA, PENNSYLVANIA, A CORPORATION OF PENNSYLVANIA.

WETTING-OUT MACHINE FOR LEATHER.

1,357,021.

Specification of Letters Patent. Patented Oct. 26, 1920.

Application filed March 26, 1920. Serial No. 368,957.

*To all whom it may concern:*

Be it known that we, ELWOOD B. AYRES and THOMAS H. RHOADS, citizens of the United States, residing in Philadelphia, Pennsylvania, have invented certain Improvements in Wetting-Out Machines for Leather, of which the following is a specification.

Our invention relates to certain improvements in wetting out machines for the treatment of leather.

One object of our invention is to provide a machine of this type with brushes for acting upon the skins as the water is applied.

A further object of the invention is to provide means for applying water in the form of a spray in given quantities.

Figure 1:
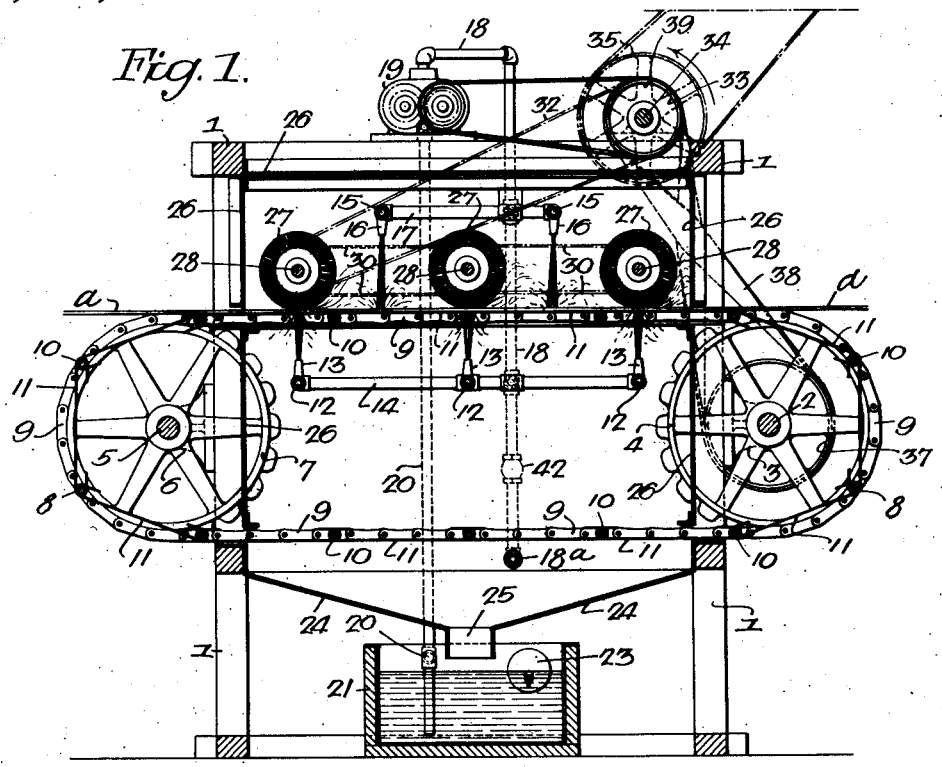
Figure 2:
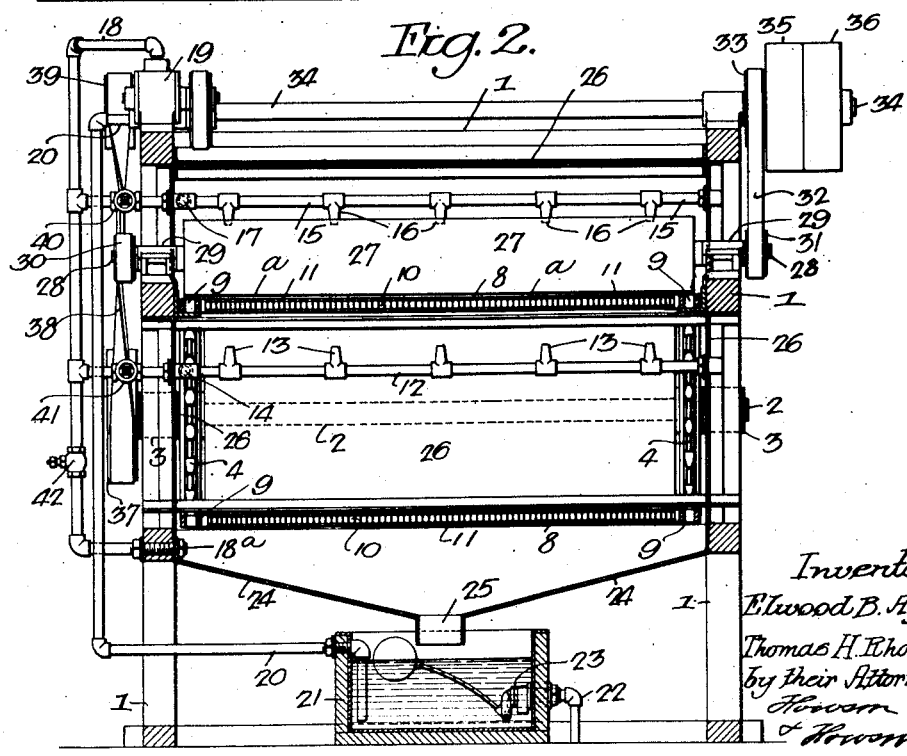

In the accompanying drawings:

Figure 1 is a longitudinal sectional view of our improved wetting out machine; and Fig. 2 is a transverse sectional view.

1 is the frame of the machine. 2 is a driven shaft mounted in bearings 3 on the side of the frame. On this shaft is a sprocket wheel 4. 5 is a shaft mounted in bearings 6 on the opposite side of the frame. Secured to this shaft is a sprocket wheel 7. 8 is an endless conveyer consisting of two side chains 9, connecting rods 10, and wire screens 11, the ends of the screens being shaped in the form of hooks and adapted to the transverse rods 10.

The skin *a* is placed on this conveyer and passed through the machine, as shown in Fig. 1. Located below the upper run of the conveyer is a series of transverse pipes 12 having nozzles 13 spaced a given distance apart. These pipes are connected together by a pipe 14 at one end. Above the upper run of the conveyer there are two or more transverse pipes 15 having nozzles 16 spaced a given distance apart. The two pipes, in the present instance, are coupled at one end to a pipe 17. The pipes 14 and 17 are connected to a vertical pipe 18 which, in turn, is connected to the exhaust side of a pump 19.

20 is a supply pipe leading to the pump and extending to the float box 21 located at the base of the machine. 22 is a water supply pipe controlled by a float valve 23. 24 is a pan extending under the machine and the bottom of the pan is inclined toward a central discharge opening 25 above the float box 21 so as to collect the water dropping from the skin and discharge it into the float box. Secured to the frame is a casing 26, which incloses the nozzles so as to prevent the spray escaping beyond the machine.

In the present instance, there are three rows of nozzles under the upper run of the conveyer and two rows above the upper run.

We locate the three brushes 27 above the upper run of the conveyer and, in the present instance, directly above the lower nozzles so that they alternate with the upper nozzles. These brushes bear upon the upper surface of the skin *a* and tend to spread it out and hold it to the conveyer, while the nozzles are spraying water on the skin. The brushes 27 are mounted on spindles 28 adapted to bearings 29 on each side of the machine and are driven, in the present instance, by belts 30. One of the spindles at one end of the machine has a pulley 31 thereon and a belt 32 passes around this pulley and around a pulley 33 on a driving shaft 34 on which are fastened loose pulleys 35 and 36 for a driving belt. On the shaft 2 is a belt pulley 37 adapted to a belt 38, which passes around a pulley 39 on the driving shaft 34. Other means of driving the conveyer and the several brushes may be used without departing from the essential features of the invention.

The flow of water to the upper spray nozzles is regulated by a valve 40 and the supply of water to the lower nozzles is regulated by a valve 41. 42 is a relief valve. The The lower end 18ª of the pipe 18, which is beyond the relief valve 42, extends above the pan 24 so that if the pressure is beyond that to which the relief valve is set the pump will discharge water into the pan.

By the above construction it will be seen that we provide a very compact machine for wetting down leather, and in which the leather is kept flat by means of brushes, which also distribute the moisture evenly over the entire surface of the leather.

Furthermore, the spray of water is regulated so that the leather will be properly sprayed, and the nozzles not only spray the moisture on both surfaces of the leather, but also on the revolving brushes.

We claim:—

1. The combination in a wetting out machine for leather, of a frame; an endless conveyer on which the skin is mounted; a series of nozzles above and below the upper run of the conveyer and between which the skin passes; and brushes located above the conveyer and acting upon the skins.

2. The combination in a machine for wetting out leather, of a frame; an endless conveyer having wire screens on which the skins are mounted; a series of nozzles above and below the upper run of the conveyer so as to spray water on both surfaces of the skin; a series of revolving brushes alternating with the upper nozzles and arranged to act upon the skins; and means for driving the brushes.

3. The combination in a wetting out machine, of an endless conveyer having perforated supporting means for the leather; a series of nozzles located above and below the upper run of the conveyer on which the leather is mounted; a circulating pump, the nozzles being connected to the said pump; a float box to which the pump is also connected; means for supplying water to said float box; a float valve for controlling the flow of water; and means for collecting the water sprayed upon the leather and directing it to the float box.

4. The combination in a wetting out machine for leather, of an endless conveyer having a perforated carrier for the leather; a series of transverse pipes extending above and below the upper run of the conveyer; nozzles located at intervals on the pipes for spraying water on both sides of the leather as it passes through the machine; rotating brushes alternating with the upper nozzles; means for rotating the brushes; a supply pump; a float box located at the bottom of the machine; a pan having an outlet above the float box to collect the waste water after it has been sprayed upon the leather; and a pipe forming communication between the float box and the pump.

5. The combination in a machine for wetting down leather, of a frame; two sprocket wheels, one mounted on each side of the frame; an endless conveyer adapted to the sprocket wheels and having screen sections forming supports for the skins; an inclosing casing; a drip pan at the bottom; a float box with which the drip pan communicates; a series of transverse pipes located above and below the upper run of the conveyer and having nozzles spaced a given distance apart so as to spray both surfaces of the skin with water; a circulating pump communicating with the transverse pipes and also communicating with the pan; a relief valve in said pipe; a pipe connecting the pump with the float box; means for driving the pump; means for driving the conveyer; a series of rotating brushes above the upper run of the conveyer; and means for driving the brushes.

ELWOOD B. AYRES.
THOMAS H. RHOADS.